US010723435B2

(12) United States Patent
Madjlesi

(10) Patent No.: US 10,723,435 B2
(45) Date of Patent: Jul. 28, 2020

(54) ACOUSTIC ABATEMENT APPARATUS FOR AN AIRCRAFT

(71) Applicant: BOMBARDIER INC., Dorval (CA)

(72) Inventor: Abdolreza Madjlesi, Thornhill (CA)

(73) Assignee: BOMBARDIER INC., Dorval (CA)

( * ) Notice: Subject to any disclaimer, the term of this patent is extended or adjusted under 35 U.S.C. 154(b) by 344 days.

(21) Appl. No.: 15/568,659

(22) PCT Filed: Apr. 19, 2016

(86) PCT No.: PCT/IB2016/052224
§ 371 (c)(1),
(2) Date: Oct. 23, 2017

(87) PCT Pub. No.: WO2016/174544
PCT Pub. Date: Nov. 3, 2016

(65) Prior Publication Data
US 2018/0148158 A1 May 31, 2018

Related U.S. Application Data

(60) Provisional application No. 62/154,531, filed on Apr. 29, 2015.

(51) Int. Cl.
*B64C 1/40* (2006.01)
*G10K 11/172* (2006.01)
*B64C 11/00* (2006.01)

(52) U.S. Cl.
CPC .............. *B64C 1/40* (2013.01); *B64C 11/00* (2013.01); *B64C 11/008* (2013.01); *G10K 11/172* (2013.01)

(58) Field of Classification Search
CPC ......... B64C 1/40; B64C 11/00; B64C 11/008; B64C 11/172; B64C 27/00; B64C 27/001;
(Continued)

(56) References Cited

U.S. PATENT DOCUMENTS

| 4,433,751 A | 2/1984 | Bonneau |
| 4,600,078 A | 7/1986 | Wirt |

(Continued)

FOREIGN PATENT DOCUMENTS

| CA | 2615590 A1 | 4/2007 |
| CN | 101793213 A | 8/2010 |

(Continued)

OTHER PUBLICATIONS

PCT international Search Report and Written Opinion dated Jun. 22, 2016 re: International Application No. PCT/IB2016/052224.
(Continued)

*Primary Examiner* — Assres H Woldemaryam
(74) *Attorney, Agent, or Firm* — Norton Rose Fulbright Canada LLP

(57) ABSTRACT

An acoustic abatement apparatus for an aircraft includes a layer of material disposed exterior to a fuselage of the aircraft, where the layer of material connects to the fuselage to establish a gap between the layer of material and the fuselage, a flexible container disposed in the gap, and at least one acoustic resonator connected to the flexible container. The at least one acoustic resonator is tuned to a predetermined resonator frequency.

20 Claims, 11 Drawing Sheets

(58) Field of Classification Search
CPC ...... B60R 13/08; G10K 11/172; G10K 11/16; G10K 11/36
See application file for complete search history.

(56) References Cited

U.S. PATENT DOCUMENTS

| | | | |
|---|---|---|---|
| 4,715,559 A | 12/1987 | Fuller | |
| 5,453,584 A * | 9/1995 | Borello | G10K 11/16 181/207 |
| 5,526,292 A | 6/1996 | Hodgson et al. | |
| 5,542,626 A * | 8/1996 | Beuck | B64C 1/062 244/105 |
| 5,788,184 A * | 8/1998 | Eddy | B32B 5/02 244/119 |
| 6,478,110 B1 * | 11/2002 | Eatwell | G10K 11/16 181/207 |
| 6,778,673 B1 | 8/2004 | Hobelsberger | |
| 7,819,221 B1 * | 10/2010 | Lane | B64G 1/22 181/206 |
| 7,913,813 B1 * | 3/2011 | Mathur | G10K 11/172 181/290 |
| 8,485,309 B2 | 7/2013 | Busse et al. | |
| 8,657,067 B1 * | 2/2014 | Mathur | B32B 5/24 181/284 |
| 8,752,667 B2 | 6/2014 | McKnight et al. | |
| 8,869,933 B1 | 10/2014 | McKnight et al. | |
| 2004/0256520 A1 * | 12/2004 | Guard | B64C 1/066 244/117 R |
| 2007/0140518 A1 * | 6/2007 | Larsen | G10K 11/172 381/354 |
| 2007/0220894 A1 | 9/2007 | Bouty et al. | |
| 2009/0078820 A1 * | 3/2009 | Lin | B64C 1/26 244/1 N |
| 2009/0152400 A1 * | 6/2009 | Verde Preckler | B64C 1/40 244/133 |
| 2014/0341385 A1 * | 11/2014 | Mekid | G10K 11/161 381/71.5 |
| 2017/0001708 A1 * | 1/2017 | Alonso-Miralles | B64C 1/40 |
| 2018/0286371 A1 * | 10/2018 | Davis | G10K 11/04 |

FOREIGN PATENT DOCUMENTS

| | | |
|---|---|---|
| CN | 103635385 A | 3/2014 |
| CN | 104443349 A | 3/2015 |
| FR | 2914479 A1 | 3/2008 |
| RU | 2117809 C1 | 8/1988 |
| WO | 9003026 A1 | 3/1990 |

OTHER PUBLICATIONS

English translation of China patent document No. CN 104443349A published on Mar. 25, 2015; accessed on Sep. 28, 2017, https://www.google.ca/patents/CN104443349A?cl=en&dq=CN104443349A.

English translation of Russian patent document No. RU 2117809 published on Aug. 20, 1988; accessed on Oct. 23, 2017, https://patents.google.com/patent/RU2117809C1/en.

English translation of France patent document No. FR 2914479 published on Oct. 3, 2008, accessed on Oct. 23, 2017, https://patents.google.com/patent/FR2914479A1/en.

H. L. Kuntz et al., Laboratory Test and Acoustic Analysis of Cabin Treatment for Propfan Test Assessment Aircraft, NASA Contractor Report 182075, pp. 1-144, National Aeronautics and Space Administration, United States of America, May 1991.

China National Intellectual Property Administration, Notification of the First Office Action dated Sep. 3, 2019 re: application No. 201680024780.0.

English translation of China patent document No. CN101793213A dated Aug. 4, 2010, https://patents.google.com/patent/CN101793213A/en?oq=CN101793213A, accessed on Oct. 31, 2019.

English translation of China patent document No. CN103635385A dated Mar. 12, 2014, https://patents.google.com/patent/CN103635385A/en?oq=CN103635385A, accessed on Oct. 31, 2019.

* cited by examiner

US 10,723,435 B2

ACOUSTIC ABATEMENT APPARATUS FOR AN AIRCRAFT

CROSS-REFERENCE TO RELATED APPLICATION(S)

This application is a national phase application under 35 U.S.C. 371 of International Patent Application No. PCT/IB2016/052224 filed on Apr. 19, 2016, which claims priority from U.S. Provisional Patent Application Ser. No. 62/154,531 filed on Apr. 29, 2015, the entire content of which is incorporated herein by reference.

FIELD OF THE INVENTION

The present invention concerns an apparatus for reducing the magnitude of sound within a vehicle, such as an aircraft. More specifically, the present invention concerns an apparatus for reducing the magnitude of noise in the cabin of a turboprop aircraft. Even more specifically, the present invention concerns an apparatus for reducing the noise experienced by passengers in the cabin of a turboprop aircraft that relies on a fluid barrier tuned by one or more Helmholtz resonators.

DESCRIPTION OF THE BACKGROUND AND RELATED ART

Helmholtz resonators operate based on principles of physics that are well understood by those skilled in the art.

With respect to aircraft design and construction, those skilled in the art are familiar with a number of different techniques that may be employed for noise abatement.

Acoustic abatement remains a design parameter for aircraft manufacturers, especially those aircraft that rely on turboprop engines for propulsion.

Turboprop aircraft are known to have distinct tonal noise at low frequencies inside the cabin of the aircraft to a greater degree than other types of aircraft, such as jet aircraft. As such, many aircraft that employ turboprop engines are equipped with active noise suppressing technology within the aircraft cabin. However, a deficiency with active noise suppressing technology is that it is often expensive, prone to breaking, adds weight to the aircraft, and is complicated to install.

Accordingly, an improved acoustic abatement system is desirable.

SUMMARY OF THE INVENTION

The present invention addresses one or more of the deficiencies with respect to the prior art.

In particular, the present invention concerns an acoustic abatement apparatus for an aircraft including a layer of material disposed exterior to a fuselage of the aircraft, where the layer of material connects to the fuselage to establish a gap between the layer of material and the fuselage. The acoustic abatement apparatus also includes a flexible container disposed in the gap and at least one acoustic resonator connected to the flexible container. The at least one acoustic resonator is tuned to a predetermined resonator frequency.

In one contemplated embodiment, the aircraft includes turboprop engines having propellers, where the layer of material is positioned on the fuselage within a radial plane of the propellers.

In another contemplated embodiment, the flexible container is a flexible bag.

It is contemplated that the present invention may include at least one acoustic resonator that is disposed on an interior of the fuselage.

The predetermined resonator frequency may correspond to a blade pass frequency in an embodiment of the present invention.

It is contemplated that the at least one acoustic resonator includes a first Helmholtz resonator tuned to a primary harmonic frequency.

It is also contemplated that the at least one acoustic resonator includes a second Helmholtz resonator tuned to a secondary harmonic frequency.

For the present invention, the predetermined resonator frequency is contemplated to lie in a range between 0 Hz and 500 Hz.

In various contemplated embodiments, the primary harmonic frequency may lie in a range between 85 Hz±10%, in a range between 90 Hz±10%, and/or in a range between 102 Hz±10%.

In various contemplated embodiments, the secondary harmonic frequency may lie in a range between 170 Hz±10%, in a range between 180 Hz±10%, and/or in a range between 204 Hz±10%.

In a further contemplated embodiment, the acoustic abatement apparatus may include a controller connected to the at least one acoustic resonator to adjust the resonator frequency thereof. If so, the controller may include a processor.

It is contemplated that the present invention may include a controller including at least one of a temperature-sensitive device and a pressure-sensitive device.

The acoustic abatement apparatus of the present invention may include at least one sensor connected to a controller to provide input to the controller for adjustment of the resonator frequency. If so, the at least one sensor may detect at least one selected from a group comprising temperature, humidity, altitude, pressure, and speed.

In another embodiment, an acoustic absorber may be disposed within the at least one acoustic resonator.

In still one further embodiment, the flexible container may include a plurality of flexible containers disposed in the gap.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Figure 1:
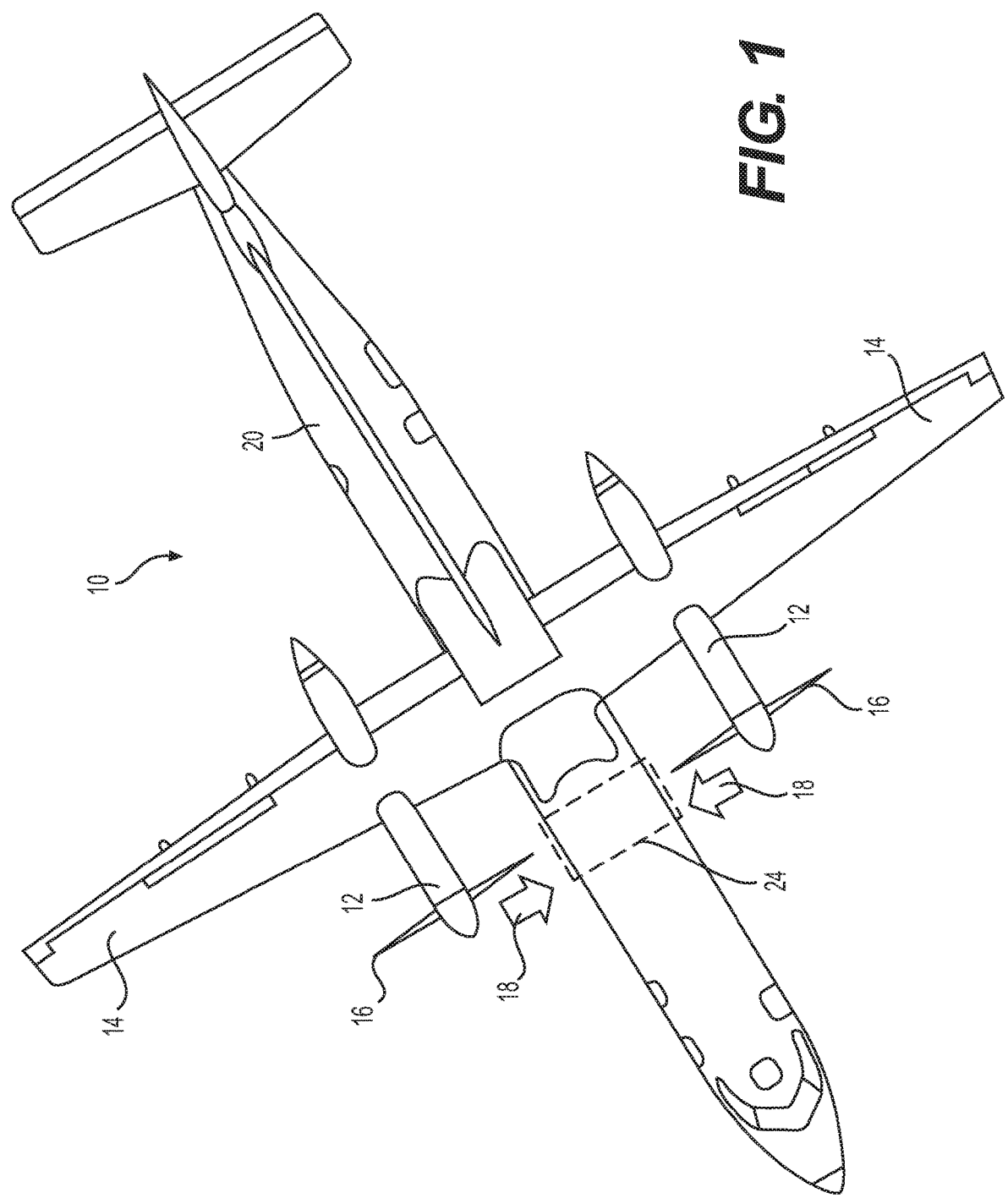
FIG. 1 is a top view of a turboprop aircraft, providing an indication of the location of the acoustic abatement apparatus of the present invention.

The present invention will now be discussed in the context of a turboprop aircraft, such as the aircraft 10 illustrated in FIG. 1.

A turboprop aircraft 10 is an aircraft that includes one or more turboprop engines 12, typically mounted on the wings 14. A turboprop engine 12 is a turbine engine that drives an aircraft propeller 16. In contrast to a turbojet engine, the turboprop engine's exhaust gases typically do not contain enough energy to create significant thrust. Instead, power from the turboprop engine 12 is imparted to the propeller 16, which generates the thrust for the aircraft 10.

While the present invention is discussed in connection with an aircraft 10 having turboprop engines 12, the present invention is not intended to be limited to aircraft 10 with any particular type of turboprop engines 12. Moreover, it is contemplated that the present invention may be applicable to any aircraft and is not considered to be limited to those aircraft with turboprop engines.

As should be apparent to those skilled in the art, as the propellers 16 rotate, the propellers 16 on a turboprop aircraft 10 generate pressure fluctuations called prop-wash at frequencies equivalent to the number of blades on the propeller 16 multiplied by the shaft frequency and its harmonics. The pressure fluctuation propagates outwardly from the propellers 16 in all directions. As should be apparent, the pressure fluctuation also travels from the propellers 16, toward the fuselage 20 of the aircraft 10, in the direction of the arrows 18 included in FIG. 1. The pressure fluctuation hits the exterior surface of the fuselage 20 and excites the fuselage structure. The surface excitation drives the fuselage skin around the plane of the propeller 16 and generates noise and vibration, which propagate to the cabin interior 22. Accordingly, the noise within the cabin 22 from the turboprop engines 12 is greatest at the point closest to the engines 12.

It is one aspect of the present invention to reduce the severity of the noise in the cabin 22 of the aircraft 10. In particular, one aspect of the present invention is to reduce the noise generated by the engines 12 and/or propellers 16 that enters the cabin 22.

At the same location on the fuselage 20 (i.e., the location closest to the engines 12), the aircraft 10 is typically provided with an ice shield 24. More particularly, the ice shield 24 is positioned at the location on the fuselage 20 that is in the radial plane of the propellers 16. The ice shield 24 extends at least partially around the circumference of the fuselage 20. The ice shield 24 adds a buffer layer of material between the propellers 16 and the fuselage 20 for protecting the fuselage against solid material, such as ice, that flies off the propellers 16 as a result of centrifugal force.

Figure 2:
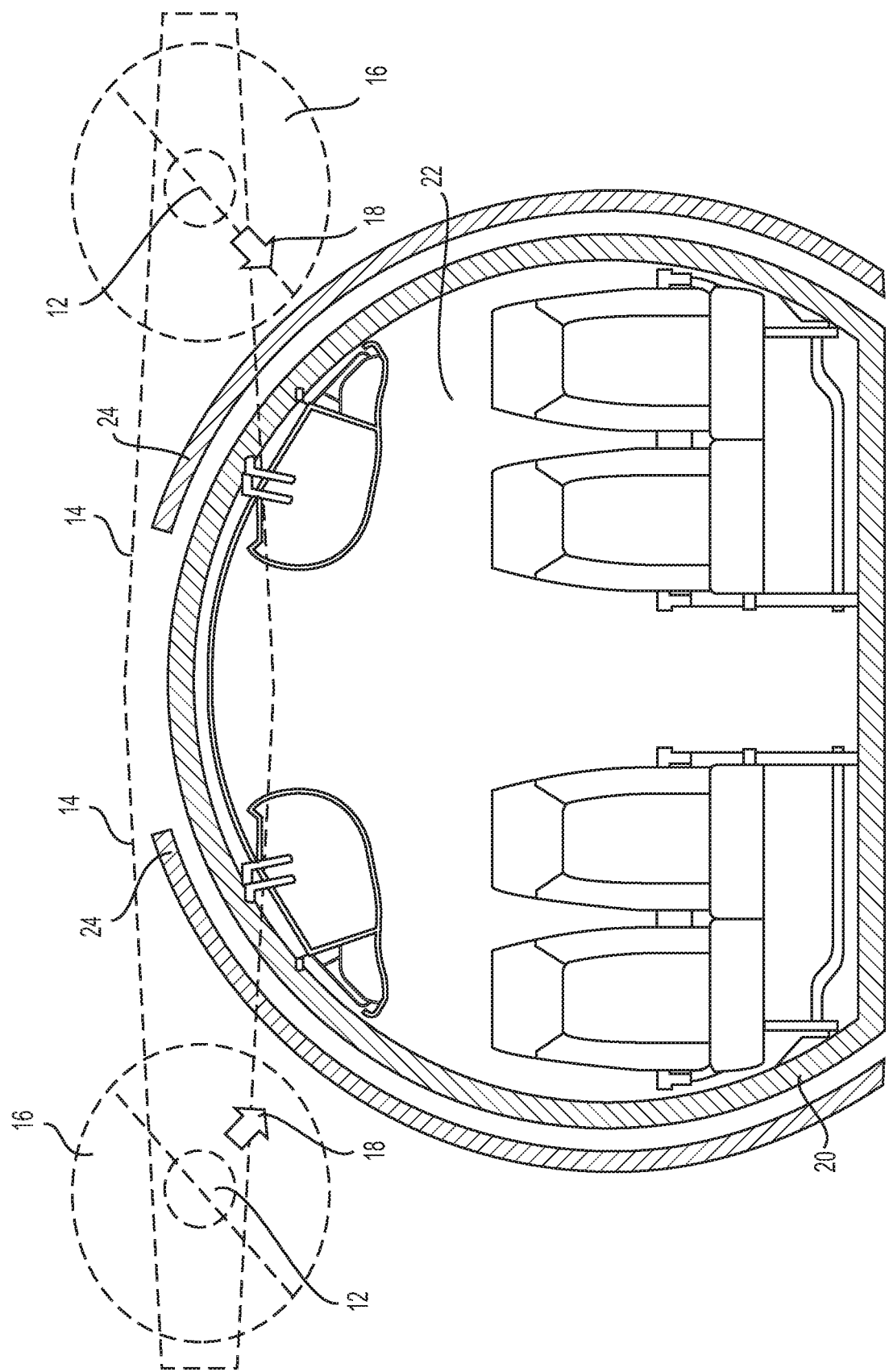
FIG. 2 is a cross-sectional view of the aircraft illustrated in FIG. 1, providing a graphical representation of one contemplated location for the placement of the acoustic abatement apparatus according to the present invention.

As should be apparent to those skilled in the art, when the propellers 16 rotate, it is possible that the propellers 16 may cause solid materials, such as ice, to be thrown against the fuselage 20 of the aircraft 10. To minimize any potential deleterious effects, the fuselage 20 is typically provided with an additional layer of material (typically an additional, outer skin of aluminum and/or composite material) that extends at least partially around the circumference of the fuselage 20. This additional band of material is referred to generally as the ice shield 24. FIG. 2 illustrates one possible location and orientation of the ice shield 24. It is noted that the ice shield 24 may extend further around the fuselage 20 (or completely around the fuselage 20), as should be apparent to those skilled in the art.

With respect to the present invention, the positioning of the ice shield 24 is illustrated in FIG. 2.

Figure 3:
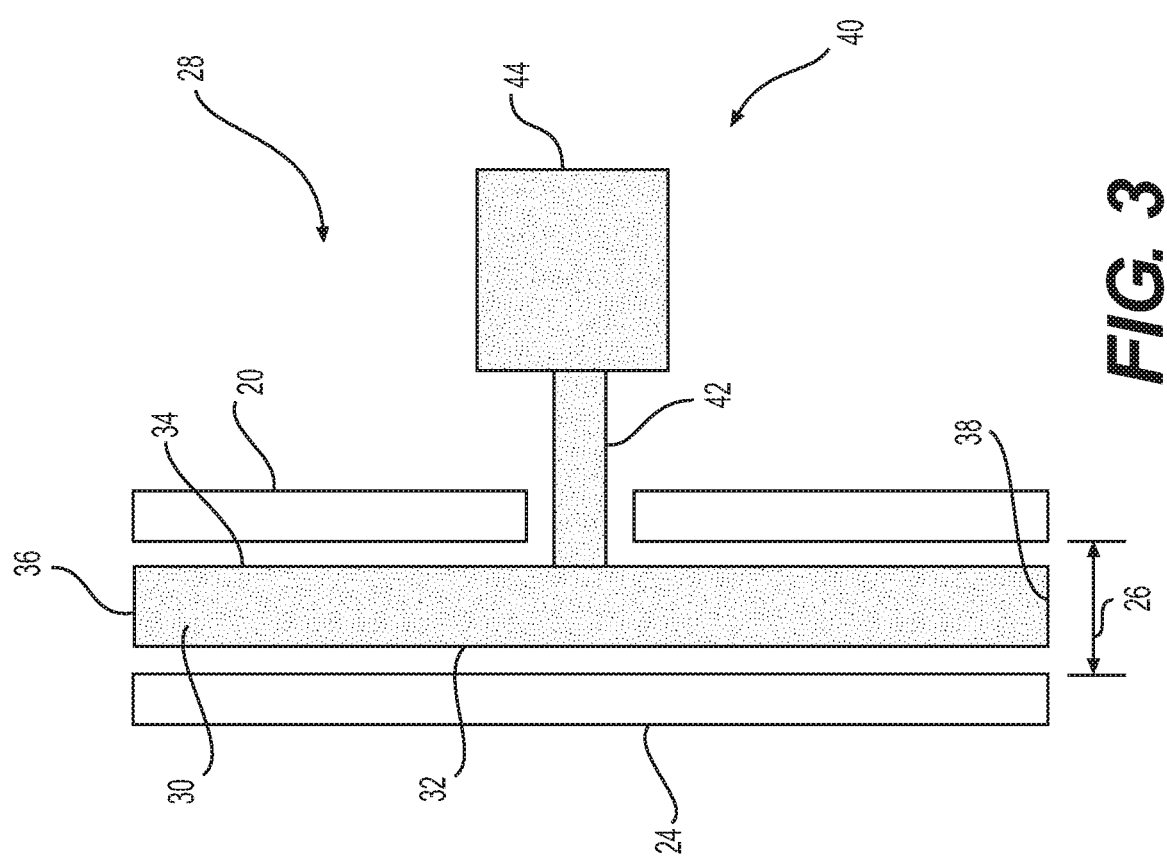
FIG. 3 is a graphical, cross-sectional representation of a portion of a first embodiment of the acoustic abatement apparatus of the present invention.

FIG. 3 is a graphical, cross-sectional representation of a portion of the acoustic abatement apparatus 28 of the present invention. The ice shield 24 is disposed outside of the fuselage 20 and, in some constructions, establishes a small air gap 26 between the fuselage 20 and the ice shield 24. The air gap 26 provides an opportunity that the present invention exploits, as discussed more fully herein.

The acoustic abatement apparatus 28 includes a flexible container 30 that is positioned in the gap 26 between the ice shield 24 and the fuselage 20. In the contemplated embodiment, the flexible container 30 is a flexible bag that may be made from any number of different flexible materials (including polymers) that are known to those skilled in the art.

It is noted that, while the present invention is described in connection with a flexible bag as the flexible container 30, the present invention is not limited solely to such a construction. To the contrary, the flexible container 30 may be constructed to have flexible and inflexible portions that are connected together. To this end, it is contemplated that, by mixing flexible and inflexible elements together to form the flexible container 30, it becomes possible to tune the flexible container 30 to respond predictably to changing environmental conditions in which the aircraft 10 operates.

The flexible container 30 is contemplated to be filled with pressurized air. However, the present invention is not limited solely to constructions where the flexible container is filled with air. It is contemplated that the flexible container may be filled with any gas without departing from the scope of the present invention.

As illustrated in FIG. 3, the flexible container 30 has an exterior side 32, an interior side 34, a top 36, and a bottom 38. The exterior side 32 is contemplated to abut against the interior surface of the ice shield 24. The interior side 34 of the flexible container 30 is contemplated to abut against the exterior surface of the fuselage 20. The top 36 and the bottom 38 are provided graphically to represent that the flexible container 30 is a closed container. It is contemplated that one or both of the ice shield 24 and the fuselage 20 may constitute part of the flexible container 30, as required or as desired for a contemplated construction of the acoustic abatement apparatus 28 of the present invention.

As also illustrated in FIG. 3, a Helmholtz resonator 40 connects to the flexible container 30. As is common for Helmholtz resonators 40, the operation of which is well known, the Helmholtz resonator 40 includes a neck portion 42 and a resonator cavity 44 connected to the neck portion 42.

In the illustrated embodiment, the Helmholtz resonator 40 is positioned within the fuselage 20, extending through an opening therein. It is noted, however, that the Helmholtz resonator 40 may be at any location without departing from the present invention. Specifically, in one contemplated variation, the Helmholtz resonator 40 may be disposed within the gap 26, together with the flexible container 30, without departing from the scope of the present invention.

A Helmholtz resonator 40 operates in accordance with the following equation:

$$f_h = \frac{C}{2\pi}\sqrt{\frac{A}{V_0 L}}. \quad \text{(equation 1)}$$

In equation 1, $f_h$ is the resonator frequency, C is the speed of sound, A is the area of the neck portion 42, $V_0$ is the volume of the resonator cavity 44, and L is the length of the neck portion 42. A fixed Helmholtz resonator 40, therefore, resonates at a fixed frequency $f_h$ depending upon the parameters identified. The resonator frequency $f_h$, therefore, also is referred to herein as the tuned frequency $f_h$.

As should be apparent, when the Helmholtz resonator 40 is connected to the flexible container 30, the Helmholtz resonator 40 will resonate at the tuned frequency $f_h$. If the tuned frequency $f_h$ is designed properly, the Helmholtz resonator 40 interacts with the pressure waves within the flexible container 30 to cancel out those pressure waves at least in part. Accordingly, the loading on the exterior surface of the fuselage 20 is reduced and the noise propagated into the cabin 22, as a result of the pressure loading at prop-wash frequencies and its harmonics, may be reduced.

For purposes of the present invention, the Helmholtz resonator 40 may be tuned to a small range of frequencies $f_h$ for suitable operation for the aircraft 10. As should be apparent to those skilled in the art, each type of aircraft 10 (i.e., each aircraft model) is designed to operate at a predetermined cruising speed, rotational speed of the propellers (measured in rpm (revolutions per minute)), and altitude for the majority of its operation. As a result, the turboprop engines 12 are contemplated to cause acoustic excitation (due to propeller 16 rotation) at a relatively constant operational frequency for the majority of the duration of every flight. With this in mind, therefore, to address noise abatement for the majority of the flight of the aircraft 10, the Helmholtz resonator 40 need not be sensitive to a wide range of resonator frequencies $f_h$. Instead, the Helmholtz resonator 40 need only be tuned to specific resonator frequency(ies) $f_h$ that are experienced by the aircraft 10 when at the cruising altitude.

As should be apparent to those skilled in the art, the resonator frequency $f_h$ for aircraft are anticipated to differ from aircraft type to aircraft type. As a result, for each type of aircraft, the resonator frequency $f_h$ is contemplated to differ. More specifically, the present invention contemplates that the Helmholtz resonator 40 will be tuned to at least one of the following prop-wash frequencies: 85 Hz, 90 Hz, and 102 Hz. Helmholtz resonators 40 also may be added to reduce second harmonics of the propeller noise within the cabin 22, which includes frequencies of 170 Hz, 180 Hz, and 204 Hz, respectively (see, e.g., FIG. 11). In connection therewith, the present invention contemplated that the Helmholtz resonators 40 will be tuned to the non-limiting resonator frequencies $f_h$ within ranges of 85 Hz±10%, 90 Hz±10%, 102 Hz±10%, 170 Hz±10%, 180 Hz±10%, and 204 Hz±10%. While there will be differences from aircraft type to aircraft type, the present invention is contemplated to address resonator frequencies $f_h$ between 0 and 500 Hz. Therefore, the Helmholtz resonators 40 will generally be tuned within the range of the $1^{st}$ and $2^{nd}$ blade pass frequencies (engine shaft rpm× number of blades).

While the present invention is described in connection with one or more Helmholtz resonators 40 being connected to the flexible container 30, it is contemplated that the present invention encompasses a broader scope. In particular, the present invention is contemplated to encompass any acoustic resonator that may be connected to the flexible container 30. In other words, the present invention should not be considered to be limited solely to Helmholtz resonators 40.

Figure 4:
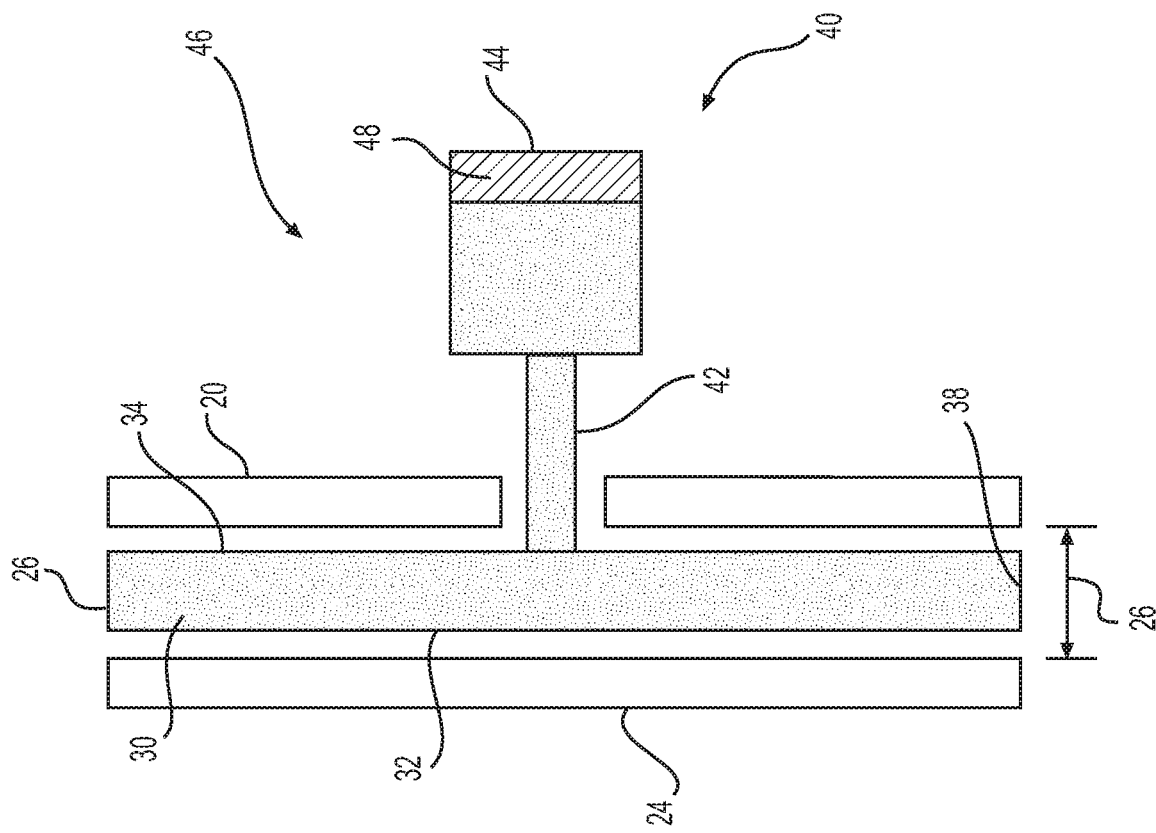
FIG. 4 is a graphical, cross-sectional representation of a portion of a second embodiment of the acoustic abatement apparatus of the present invention.

FIG. 4 illustrates a second embodiment of an acoustic abatement apparatus 46 according to the present invention. In this embodiment, the features are contemplated to be the same as illustrated in FIG. 3, with one addition. In particular, an acoustic absorber 48 has been added to the resonator cavity 44 of the Helmholtz resonator 40. The acoustic absorber 48 is contemplated to assist with tuning of the Helmholtz resonator 40 by altering the acoustic properties of the Helmholtz resonator 40 in a manner that should be apparent to those skilled in the art.

Figure 5:
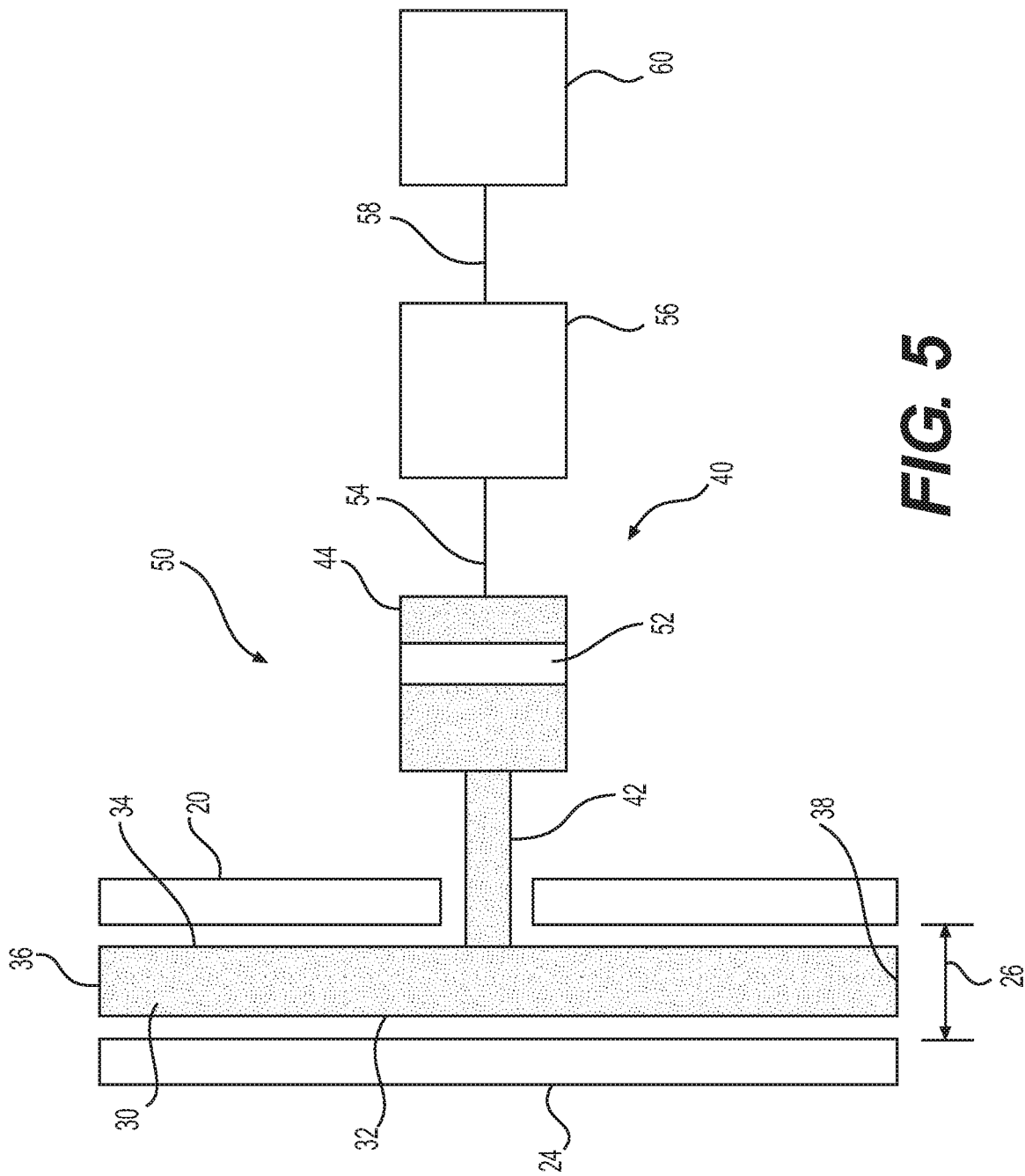
FIG. 5 is a graphical, cross-sectional representation of a portion of a third embodiment of the acoustic abatement apparatus of the present invention.

FIG. 5 illustrates a third embodiment of an acoustic abatement apparatus 50 according to the present invention. In this embodiment, the resonator cavity 44 includes an adjustable piston 52. The piston 52 is connected, via a communication line 54, to a controller 56. In this embodiment, it is contemplated that the controller 56 will be constructed to adjust the position of the piston 52 within the resonator cavity 44. By adjusting the position of the piston 52, the volume V within the resonator cavity 44 changes, which alters the resonance frequency $f_h$ of the Helmholtz resonator 40.

By this third embodiment of the acoustic abatement apparatus 50, it is contemplated that the Helmholtz resonator 40 may be adjusted dynamically by the controller 56 during flight. As a result, it becomes possible to accommodate changes in the noise transmitted to the interior of the cabin 22 during several modes of flight, including taxi, take-off, and landing, for example.

It is contemplated that the controller 56 may require one or more input signals for operation. As such, a communication line 58 connects the controller 56 to a sensor 60. The sensor 60 may detect any one or more of temperature, humidity, altitude, pressure, speed, etc., for input to the controller 56. With input from the sensor 60 (or plurality of sensors 60), the controller 56 may adjust the resonance frequency $f_h$ of the Helmholtz resonator 40 for optimal sound abatement.

The sensors 60 may be dedicated to the controller 56. Alternatively, the sensors 60 may provide information to the flight management system ("FMS") on board the aircraft 10, with the same information also being provided to the controller 56.

Figure 6:
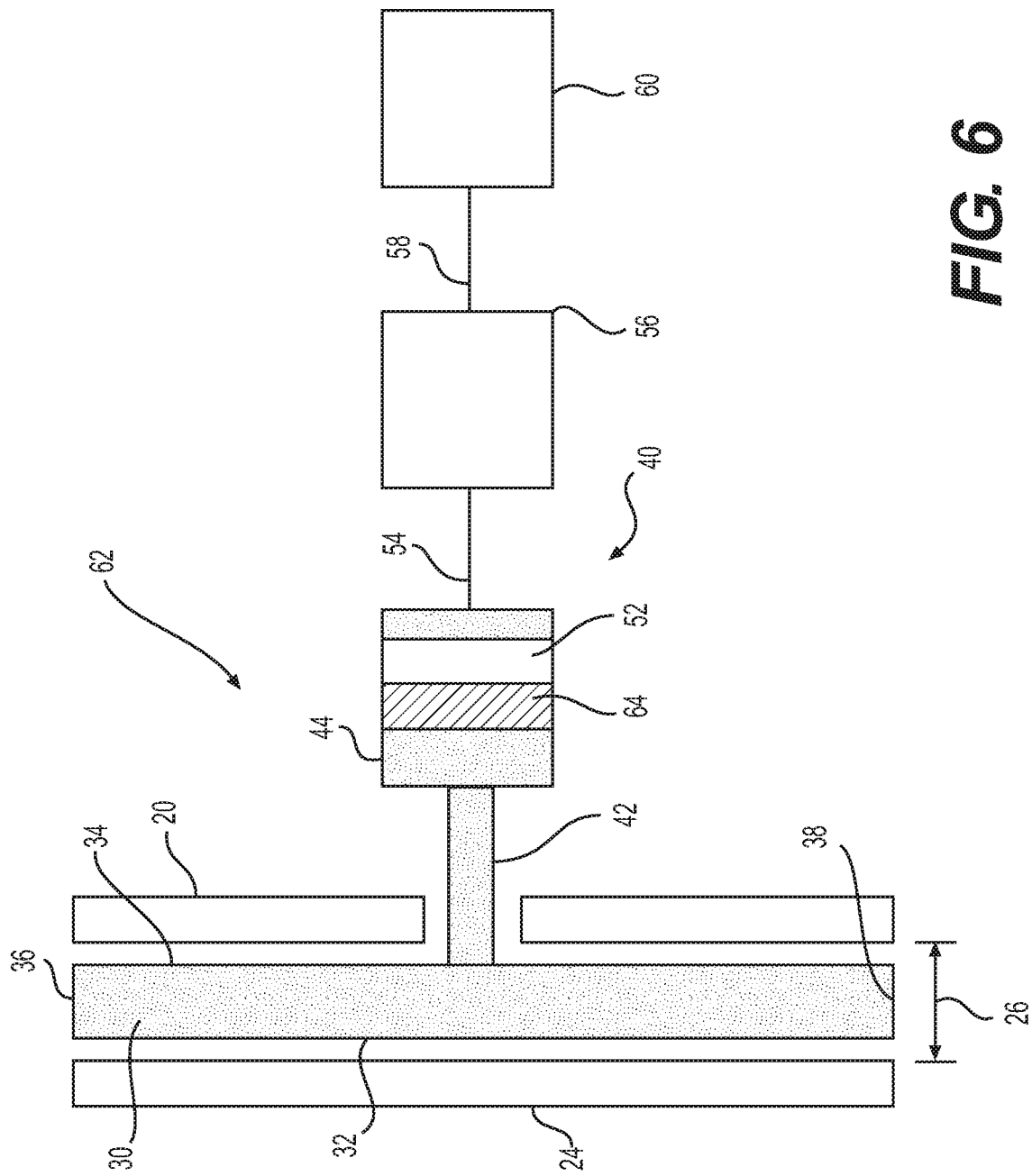
FIG. 6 is a graphical, cross-sectional representation of a portion of a fourth embodiment of the acoustic abatement apparatus of the present invention.

FIG. 6 illustrates a fourth embodiment of an acoustic abatement apparatus 62 according to the present invention.

This embodiment is contemplated to be the similar to the third embodiment except that an acoustic absorber 64 has been added to the resonator cavity 44. As before, the acoustic absorber 64 is contemplated to assist with tuning of the Helmholtz resonator 40 and, therefore, to assist with sound absorption.

As noted above, it is contemplated that the controller 56 will include a processor that is responsive to input signals from the sensor(s) 60. The processor may include an algorithm to tune the Helmholtz resonator 40. It is contemplated that the controller 56 may issue control signals as a result of a look-up function associated with a look-up table. The present invention is not contemplated to be limited to any particular mode of operation of the controller 56.

Alternatively, it is contemplated that the controller 56 may be responsive to selected variables without computer processing. For example, the controller 56 may be a mechanical device that alters the position of the piston 52 in response to selected variables. In one contemplated embodiment, the controller 56 may be a temperature-responsive device, such as a spring, that alters the position of the piston 52. In another contemplated embodiment, the controller 56 may be a pressure-responsive device. Still further devices may be employed as the controller 56 without departing from the scope of the present invention.

In still a third contemplated variant, the controller 56 may operate by combining processor functionality with one or more elements that are responsive to changing environmental conditions. For example, the controller 56 may combine a temperature-sensitive material with an electrical controller to tune the Helmholtz resonator 40.

Figure 7:
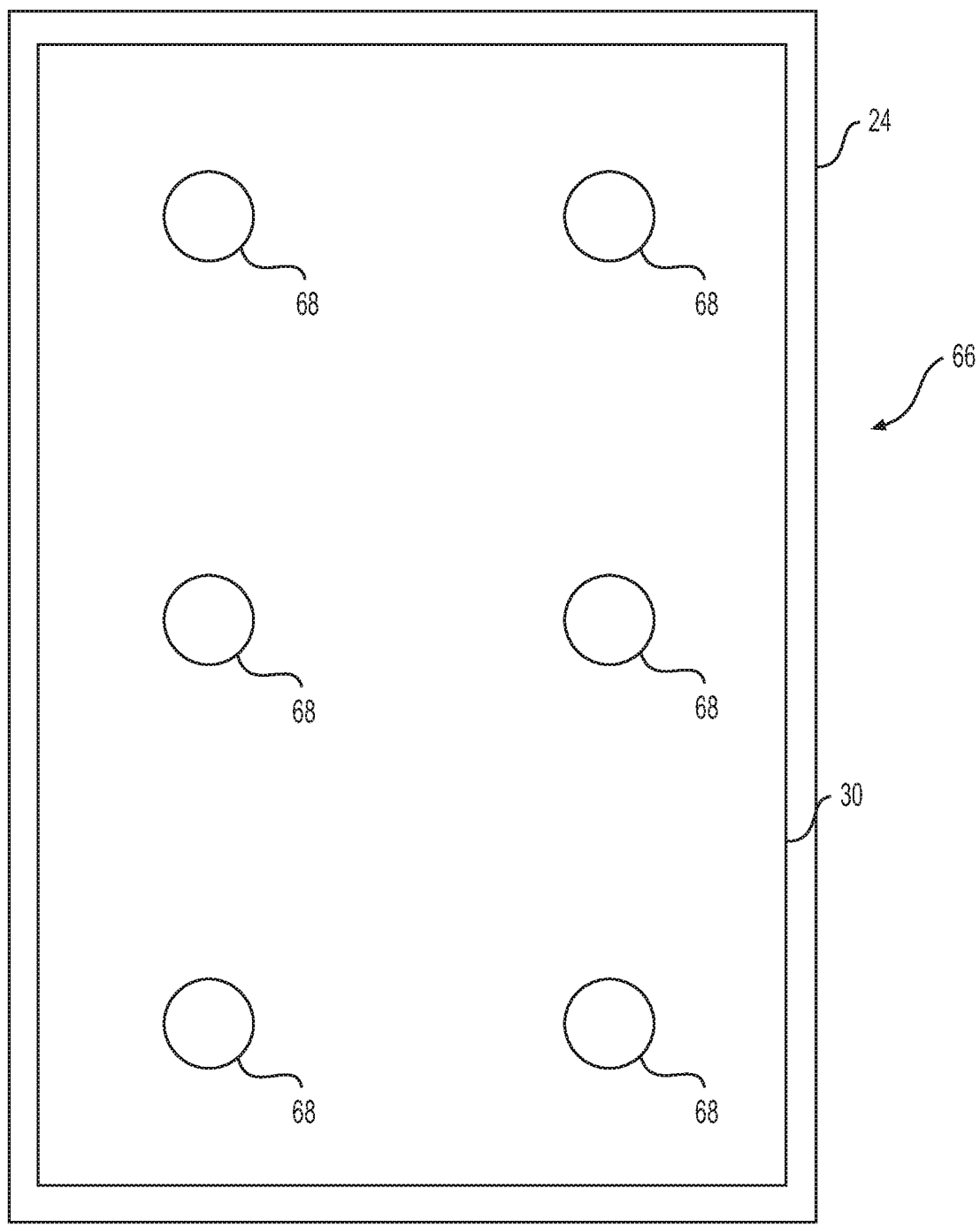
FIG. 7 is a graphical, front-view representation of a fifth embodiment of the acoustic abatement apparatus of the present invention.

FIG. 7 is a graphic illustration of a fifth embodiment of the acoustic abatement apparatus 66 according to the present invention. This graphic illustration is intended to illustrate the positioning of the flexible container 30 in relation to the ice shield 24. In this embodiment, six Helmholtz resonators 68 are connected to the flexible container 30. Each of the Helmholtz resonators 68 are contemplated to assist with acoustic abatement.

While six Helmholtz resonators 68 are illustrated, the acoustic abatement apparatus 66 may include a larger or a fewer number of Helmholtz resonators 68 without departing from the present invention. In the illustrated embodiment, all of the Helmholtz resonators 68 may be tuned to the same resonator frequency $f_h$. Alternatively, each of the Helmholtz resonators 68 may be tuned to a different resonator frequency $f_h$, thereby increasing the noise abatement range for the acoustic abatement apparatus 66 of the present invention.

Figure 8:
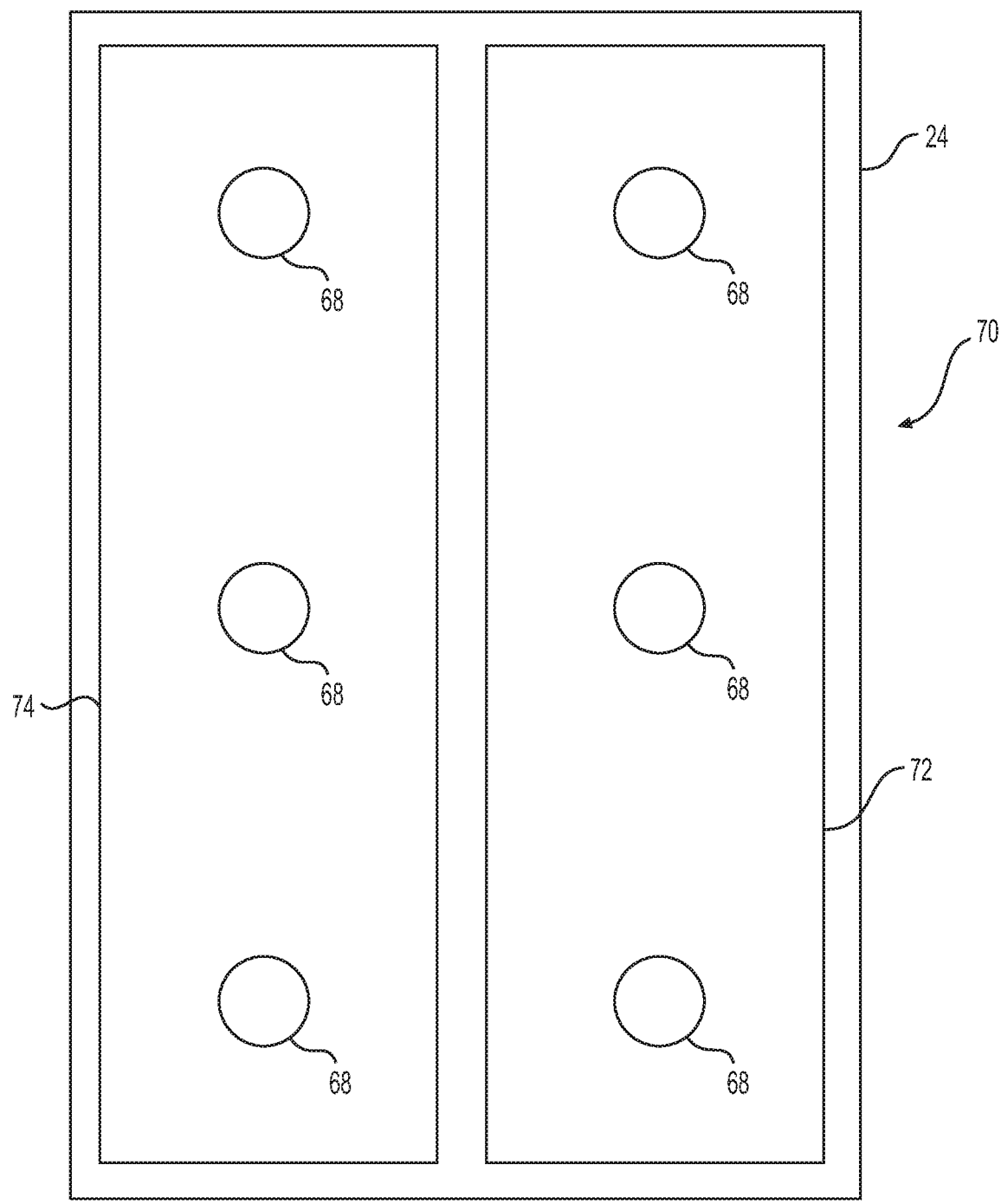
FIG. 8 is a graphical representation of a sixth embodiment of the acoustic abatement apparatus of the present invention.

FIG. 8 is a graphic illustration of a sixth embodiment of the acoustic abatement apparatus 70. In this embodiment, the flexible container 30 has been divided into two flexible containers 72, 74.

Figure 9:
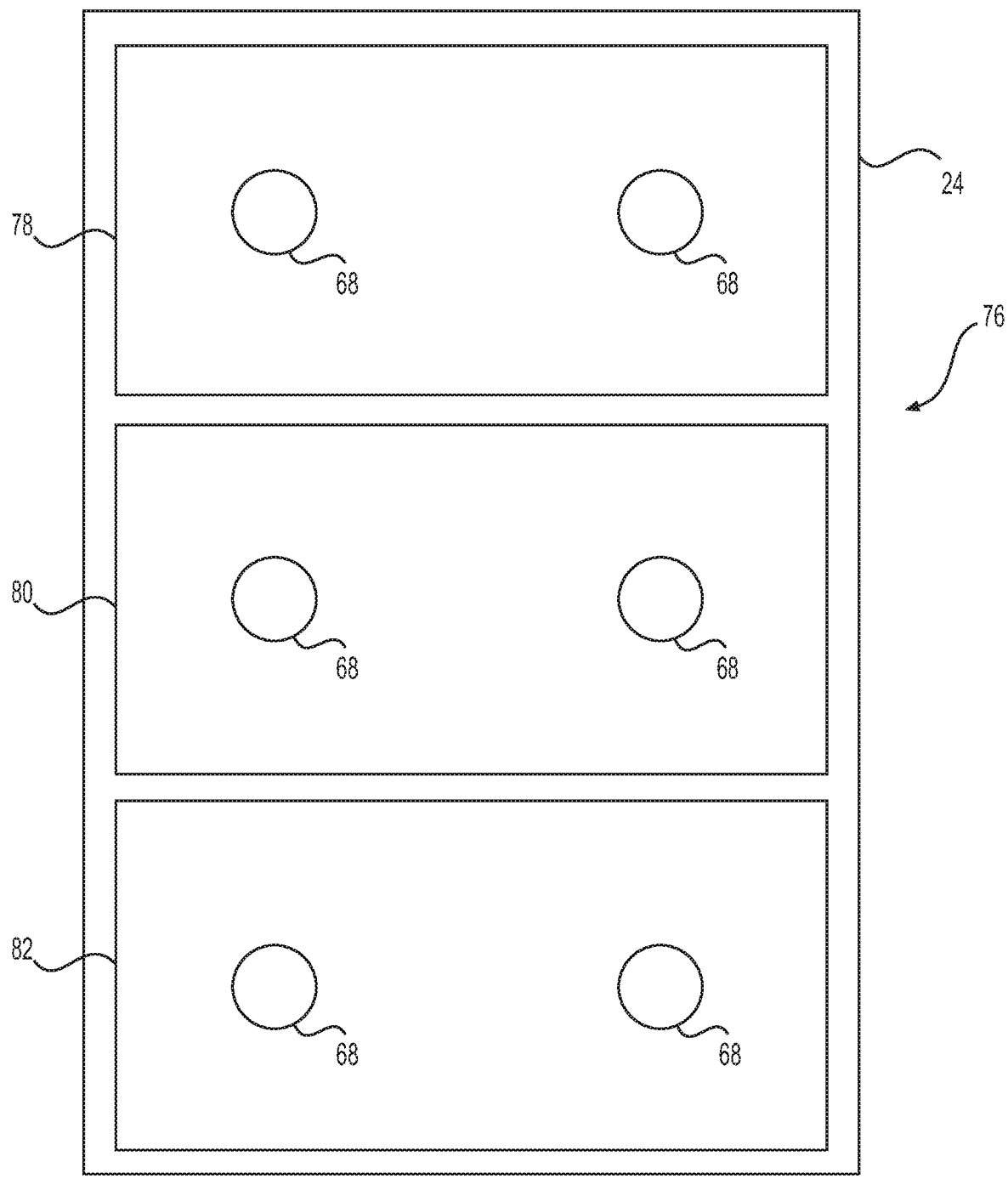
FIG. 9 is a graphical representation of a seventh embodiment of the acoustic abatement apparatus of the present invention.

FIG. 9 is a graphic illustration of a seventh embodiment of the acoustic abatement apparatus 76. In this embodiment, the flexible container 30 has been divided into three flexible containers 78, 80, 82.

Figure 10:
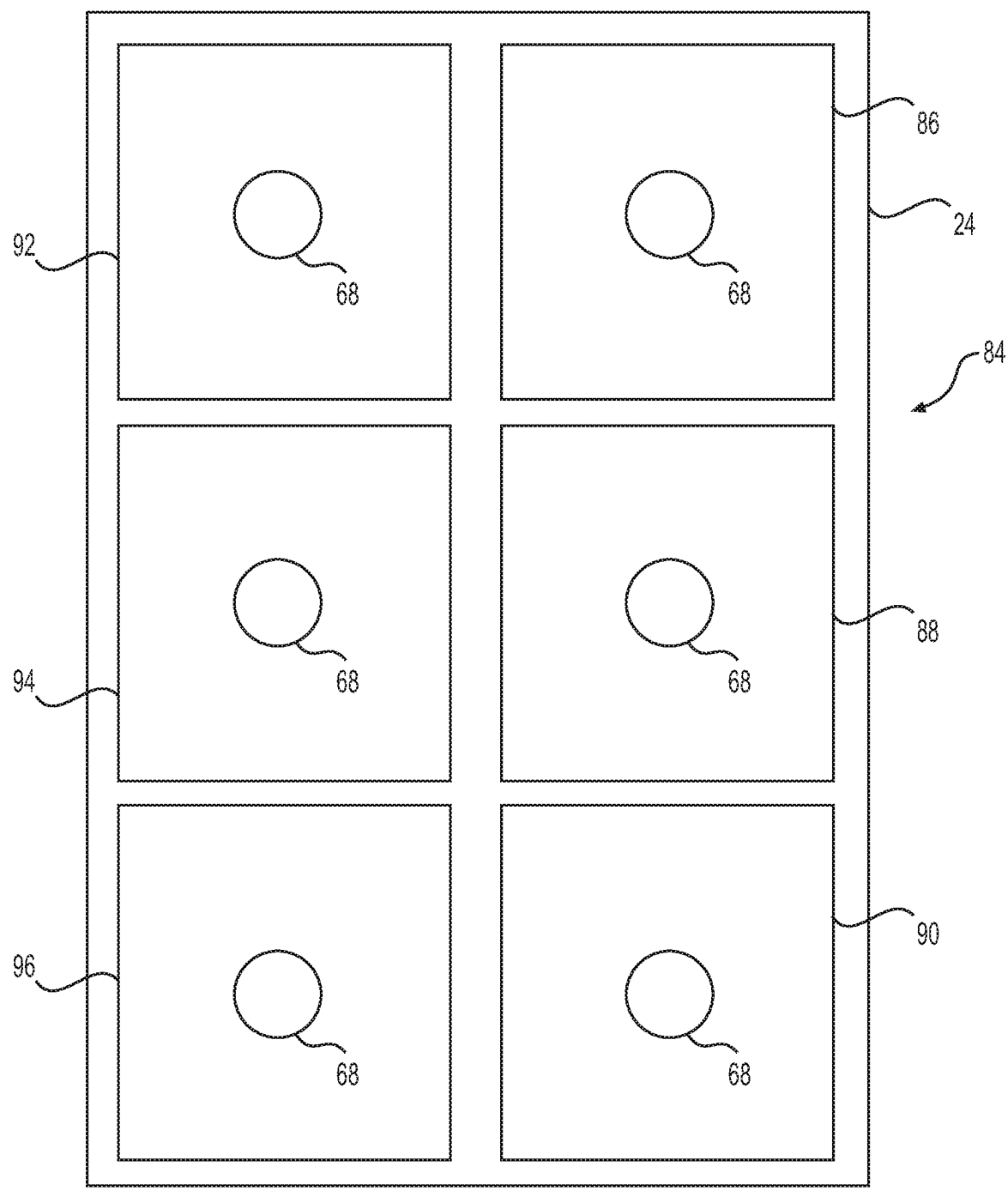
FIG. 10 is a graphical representation of an eighth embodiment of the acoustic abatement apparatus of the present invention.

FIG. 10 is a graphic illustration of an eighth embodiment of the acoustic abatement apparatus 84. In this embodiment, the flexible container 30 has been divided into six flexible containers 86, 88, 90, 92, 94, 96.

Figure 11:
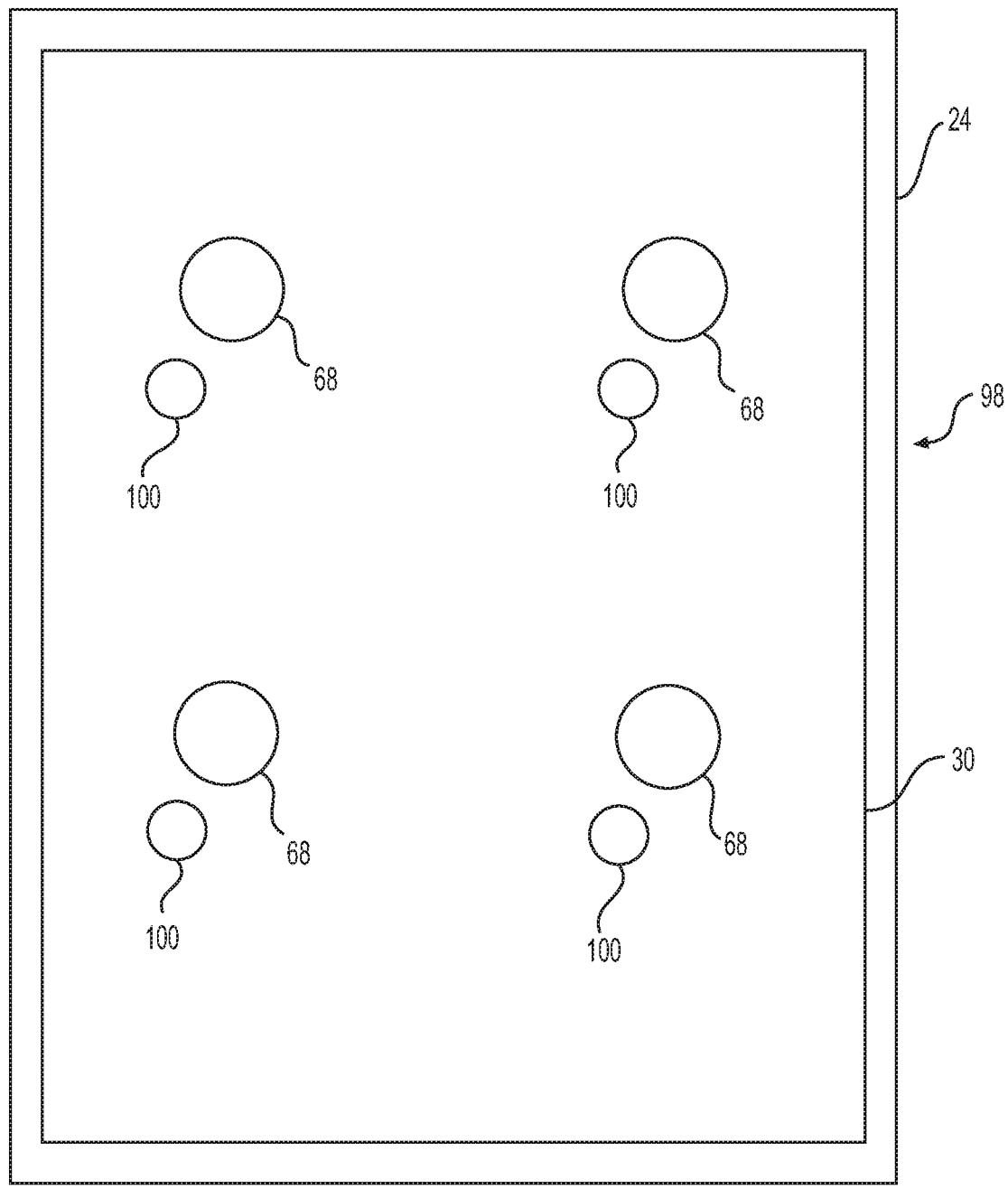
FIG. 11 is a graphical representation of a ninth embodiment of the acoustic abatement apparatus of the present invention.

FIG. 11 is a graphic illustration of a ninth embodiment of the acoustic abatement apparatus 98 according to the present invention. This graphic illustration is intended to illustrate the positioning of the flexible container 30 in relation to the ice shield 24. In this embodiment, four Helmholtz resonators 68 are connected to the flexible container 30, as provided in FIG. 7. Four additional Helmholtz resonators 100 are connected to the flexible container 30. In this illustration, the first set of Helmholtz resonators 68 is tuned to a first non-limiting prop-wash frequency (such as 85 Hz, 90 Hz, and/or 102 Hz, for example) while the second set of Helmholtz resonators 100 are tuned to a second non-limiting prop-wash frequency (such as 170 Hz, 180 Hz, and/or 204 Hz, for example). Although certain frequencies are provided herein for the sake of example, it is to be understood that the present invention is not limited to the specific frequency ranges described. This embodiment, therefore, is intended to encompass a construction where the first Helmholtz resonators 68 are tuned to a primary harmonic frequency and the second set of Helmholtz resonators 100 are tuned to a secondary harmonic frequency. As should be apparent, the second set of Helmholtz resonators 100 may be employed in any of the remaining embodiments of the present invention.

While FIG. 11 illustrates four first-order Helmholtz resonators 68 and four second-order Helmholtz resonators 100, the present invention is not limited to this construction. Any number of first-order Helmholtz resonators 68 and any number of second-order Helmholtz resonators may be employed without departing from the scope of the present invention. In addition, the present invention contemplates Helmholtz resonators that may be tuned to tertiary, quaternary, and other ancillary harmonics.

As should be apparent from FIGS. 7-11, the flexible container 30 may encompass any number and/or shape of individual flexible containers without departing from the scope of the present invention.

As should be apparent from the foregoing, one aspect of the various embodiments of the noise abatement apparatus 28, 46, 50, 62, 66, 70, 76, 84, 98 of the present invention is to attenuate noise prior to the noise being transmitted into the cabin 22 of the aircraft 10. The present invention, therefore, stands in contrast to active noise abatement systems that are known in the prior art. Active noise cancellation systems typically are provided within the cabin 22 of the aircraft 10 to cancel (using sound interference principles, among others) undesirable sound frequencies in the aircraft cabin 22. As should be apparent to those skilled in the art active noise cancellation systems are complex, add to the weight of the aircraft 10, break easily, and are difficult to install. The present invention is contemplated to address one or more of these deficiencies in the prior art.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. An acoustic abatement apparatus for an aircraft, comprising:
   a fuselage of the aircraft;
   a layer of material disposed exterior to the fuselage of the aircraft, wherein the layer of material is connectable to the fuselage to establish a gap between the layer of material and the fuselage;
   a flexible container disposed in the gap; and
   at least one acoustic resonator connected to the flexible container,
   wherein the at least one acoustic resonator is tuned to a predetermined resonator frequency and the at least one acoustic resonator is disposed on an interior of the fuselage.

2. The acoustic abatement apparatus of claim 1, wherein the layer of material is connectable to a portion of the fuselage within a radial plane of a propeller of the aircraft.

3. The acoustic abatement apparatus of claim 1, wherein the flexible container comprises a flexible bag.

4. The acoustic abatement apparatus of claim 1, wherein the predetermined resonator frequency corresponds to a blade pass frequency.

5. The acoustic abatement apparatus of claim 1, wherein the at least one acoustic resonator comprises a first Helmholtz resonator tuned to a primary harmonic frequency.

6. The acoustic abatement apparatus of claim 5, wherein the at least one acoustic resonator comprises a second Helmholtz resonator tuned to a secondary harmonic frequency.

7. The acoustic abatement apparatus of claim 1, wherein the predetermined resonator frequency lies in a range of 0 Hz to 500 Hz.

8. The acoustic abatement apparatus of claim 5, wherein the primary harmonic frequency lies in a range of 85 Hz±10%.

9. The acoustic abatement apparatus of claim 5, wherein the primary harmonic frequency lies in a range between of 90 Hz±10%.

10. The acoustic abatement apparatus of claim 5, wherein the primary harmonic frequency lies in a range between of 102 Hz±10%.

11. The acoustic abatement apparatus of claim 6, wherein the secondary harmonic frequency lies in a range between of 170 Hz±10%.

12. The acoustic abatement apparatus of claim 6, wherein the secondary harmonic frequency lies in a range of 180 Hz±10%.

13. The acoustic abatement apparatus of claim 6, wherein the secondary harmonic frequency lies in a range of 204 Hz±10%.

14. The acoustic abatement apparatus of claim 1, further comprising:
    a controller connected to the at least one acoustic resonator and configured to adjust the resonator frequency thereof.

15. The acoustic abatement apparatus of claim 14, wherein the controller includes a processor.

16. The acoustic abatement apparatus of claim 14, wherein the controller comprises at least one of a temperature-sensitive device and a pressure-sensitive device.

17. The acoustic abatement apparatus of claim 16, further comprising:
    at least one sensor connected to the controller and configured to provide input to the controller for adjustment of the resonator frequency.

18. The acoustic abatement apparatus of claim 17, wherein the at least one sensor is configured to detect at least one selected from a group comprising temperature, humidity, altitude, pressure, and speed.

19. The acoustic abatement apparatus of claim 1, further comprising:
    an acoustic absorber disposed within the at least one acoustic resonator.

20. The acoustic abatement apparatus of claim 1, wherein the flexible container comprises a plurality of flexible containers disposed in the gap.

* * * * *